United States Patent
Dietle et al.

[11] Patent Number: 5,873,576
[45] Date of Patent: Feb. 23, 1999

[54] SKEW AND TWIST RESISTANT HYDRODYNAMIC ROTARY SHAFT SEAL

[75] Inventors: Lannie Dietle, Sugar Land; Manmohan Singh Kalsi, Houston, both of Tex.

[73] Assignee: Kalsi Engineering, Inc., Sugar Land, Tex.

[21] Appl. No.: 927,960

[22] Filed: Sep. 11, 1997

Related U.S. Application Data

[63] Continuation of Ser. No. 495,272, Jun. 27, 1995, abandoned.

[51] Int. Cl.$^6$ ........................................... F16J 15/16
[52] U.S. Cl. ........................... 277/559; 277/572; 277/587
[58] Field of Search ................................... 277/559, 549, 277/560, 572, 587, 910

[56] References Cited

U.S. PATENT DOCUMENTS

| | | | |
|---|---|---|---|
| 3,027,168 | 3/1962 | Herbruggen | 277/215 |
| 3,117,796 | 1/1964 | Liebig | 277/152 |
| 3,123,367 | 3/1964 | Brummer et al. | 277/152 |
| 3,970,321 | 7/1976 | Dechavanne | 277/188 A |
| 4,484,753 | 11/1984 | Kalsi . | |
| 4,610,319 | 9/1986 | Kalsi . | |
| 4,750,747 | 6/1988 | Holzer | 27/134 |
| 4,865,170 | 9/1989 | Ciepichal | 277/202 |
| 5,127,661 | 7/1992 | Franson et al. | 277/205 |
| 5,230,520 | 7/1993 | Dietle et al. . | |
| 5,269,537 | 12/1993 | Kiesel | 277/165 |
| 5,328,178 | 7/1994 | Nies | 277/215 |

*Primary Examiner*—Daniel G. DePumpo
*Attorney, Agent, or Firm*—Bush, Riddle, & Jackson L.L.P.

[57] ABSTRACT

A hydrodynamically lubricated squeeze packing type rotary shaft seal suitable for lubricant retention and environmental exclusion which incorporates one or more resilient protuberances which and cooperate with the gland walls to hold the seal straight in its installation groove in unpressurized and low pressure lubricant retention applications thereby preventing skew-induced wear caused by impingement of abrasive contaminants present in the environment, and which also serve as radial bearings to prevent tipping of the seal within its installation gland.

7 Claims, 3 Drawing Sheets

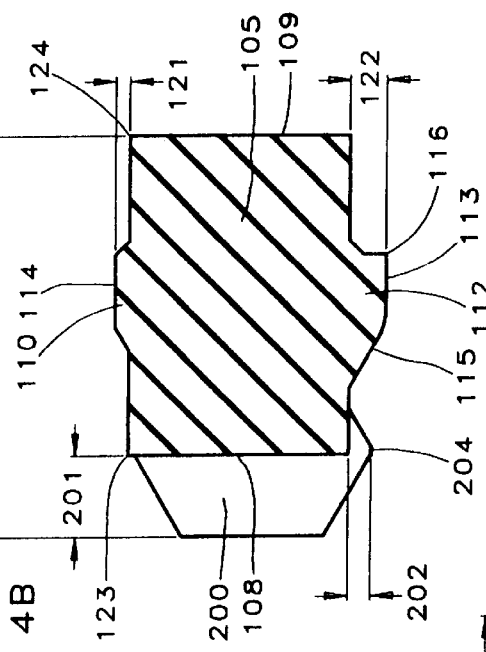
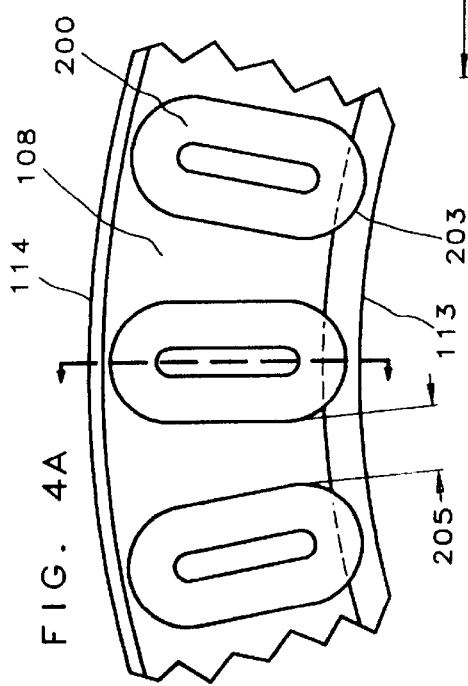
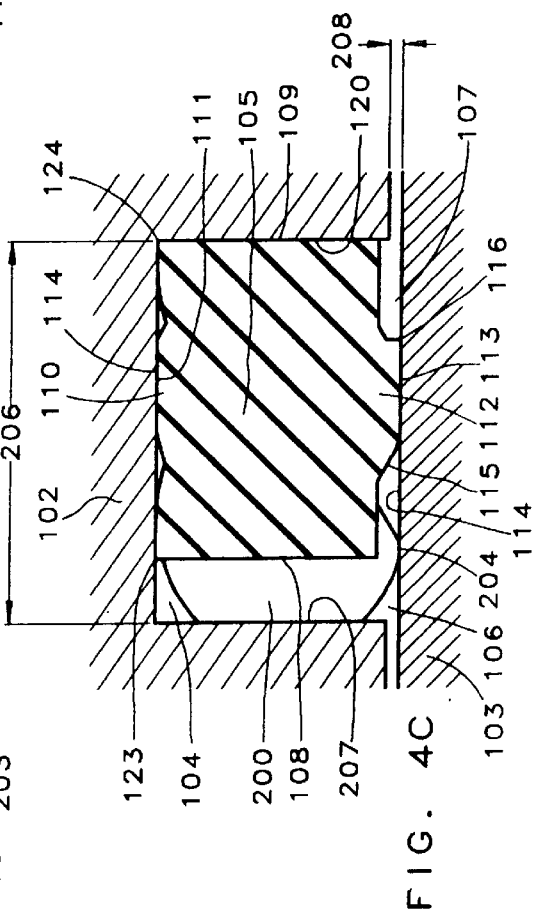

SKEW AND TWIST RESISTANT HYDRODYNAMIC ROTARY SHAFT SEAL

"This application is a continuation of application Ser. No. 08/495,272 filed on Jun. 27, 1995" now abandoned.

This invention was made with Government support under contract DE-FG03-90ER80939 awarded by the Department of Energy. The Government has certain rights in this invention.

FIELD OF THE INVENTION

This invention relates generally to rotary seals such as rotary shaft seals for establishing a seal between a relatively rotating surface and a housing within which the relatively rotating surface is located. More specifically the present invention concerns ring-like rotary seals of the squeeze packing type which composed of elastomeric sealing material which are contained within seal grooves and provide a seal geometry that provides for resistance to becoming skewed or twisted within the seal groove. This skew and twist resistant seal may also take the form of a hydrodynamic seal which wedges a lubricant film between the seal and the relatively rotating surface to inhibit seal wear and to exclude contaminants from the dynamic sealing interface.

Although the present invention is discussed herein particularly as it relates to shaft seals, such is not to be considered limiting of the scope of the invention. The invention also has application to other types of dynamic seals as well.

BACKGROUND OF THE INVENTION

Industry has found many uses for the hydrodynamically lubricated, ring shaped squeeze packing type rotary shaft seals embodying the principles set forth in U.S. Pat. Nos. 4,610,319 and 5,230,520 and marketed by Kalsi Engineering, Inc. of Sugar Land, Tex. under the registered trademark, Kalsi Seals®. Kalsi Seals are used to provide lubricant retention and contaminant exclusion in harsh abrasive environments, such as the downhole oil field drilling environment. Present commercial oil field applications include rotary cone rock bits, mud motors, high speed coring swivels, and rotating drilling heads. All references herein to hydrodynamically lubricated seals or hydrodynamic seals are directed to seals embodying the principles of the above identified U.S. Patents.

FIGS. 1, 2, 2A and 3 of this specification represent Kalsi Seals prior art which is discussed herein to enhance the readers' understanding of the distinction between the prior art seals and the present invention.

Referring now to the prior art of FIG. 1 there is shown a cross-sectional view of a hydrodynamically lubricated squeeze packing type rotary shaft sealing assembly generally at 1 including a housing 2 from which extends a rotary shaft 3. The housing defines an internal seal installation groove, seat or gland 4 within which is located a ring shaped hydrodynamic rotary shaft seal 5 which is constructed in accordance with the principles of the above mentioned patents and which is shown in greater detail in the partial sectional views of FIGS. 2 and 2A.

FIG. 2 represents the cross-sectional configuration of the prior art seal 5 when located within its seal groove and radially compressed between the rotary shaft and the radially outer wall of the seal groove, and FIG. 2A represents the radially uncompressed cross-sectional shape of the prior art seal.

The hydrodynamic seal is used to separate the lubricant 6 from the environment 7, and to prevent intermixing of the lubricant and the contaminant matter present within the environment. The environment usually contains highly abrasive particulate matter within a liquid vehicle; an example of such an environment would be oil field drilling fluid. From an overall orientation standpoint, the end of the seal which is oriented toward the lubricant is surface 8 and the end of the seal which is oriented toward the environment 7 is surface 9.

When the seal 5 is installed in the circular seal groove or seat 4, a circular radially protruding static sealing lip 10 is compressed against a counter-surface 11 of the groove per the teachings of U.S. Pat. No. 5,230,520. At the inner periphery of the circular sealing element 5 there is provided an inner circumferential sealing lip 12 that defines a dynamic sealing surface 13 that is compressed against a counter-surface 14 of the rotatable shaft 3. The circular seat or seal groove 4 is sized to hold the resilient circular sealing element 5 in radial compression against the cylindrical sealing surface 14 of the shaft 3, thereby initiating a static seal with the housing and shaft in the same manner as any conventional squeeze packing seal, such as an O-Ring. When shaft rotation is not present, a liquid tight seal is maintained at the static sealing interface between the static sealing lip 10 and the mating counter-surface 11 of the seat, and between the dynamic sealing lip 12 and the counter-surface 14 of the shaft.

When shaft rotation takes place, the hydrodynamic seal remains stationary with respect to the housing, and maintains a static sealing interface with said housing, while the seal-to-shaft interface becomes a dynamic sealing interface. The inner peripheral surface of the hydrodynamic seal inner lip 12 incorporates a geometry that promotes long seal life by hydrodynamically lubricating the dynamic seal-to-shaft interfacial zone, and by excluding environmental contaminates from the seal to shaft interface. The inner peripheral hydrodynamic seal lip 12 incorporates a wavy, axially varying edge 15 on its lubricant side, and a straight, sharp edge 16 on its environmental side. The radial cross-section of FIGS. 2 and 2A is taken at a circumferential location which represents the average width of the dynamic sealing lip. As relative rotation of the shaft takes place, the wavy, axially varying edge 15 on the lubricant side of the dynamic sealing lip, which has a gradually converging relationship with the shaft in the axial and circumferential directions, generates a hydrodynamic wedging action that introduces a lubricant film between the seal inner surface 13 and the counter-surface 14 of the shaft per the teachings of U.S. Pat. No. 4,610,319. This lubricant film physically separates the seal and the shaft, and thereby prevents the typical dry rubbing type wear associated with conventional non-hydrodynamic squeeze packing type seals, and thereby prolongs seal and mating shaft surface life and makes higher service pressures practical. This hydrodynamic action, which is described in detail in U.S. Pat. No. 4,610,319, can more easily be understood by referring to FIG. 3, which shows a flat development of the cylindrical sealing surface 14 of the shaft, and which depicts the footprint of the dynamic inner lip 12 of the seal against the sealing surface 14 of the shaft. From an orientation standpoint, the lubricant is shown at 6, the seal footprint is shown at 17, and the environment is shown at 7. The lubricant side of the footprint has a wavy edge 18 created by the wavy edge 15 of the seal, and the mud side of the footprint has a straight edge 19 created by the sharp circular corner 16 of the seal. The lubricant is pumped into the dynamic sealing interface by the normal component $V_N$ of the rotational velocity V.

Referring again to FIG. 2 and FIG. 2A, the sharp circular corner 16 of the environmental side of the seal is not axially varying, and does not generate a hydrodynamic wedging action with the environment in response to relative rotary motion, and thereby functions to exclude particulate contaminants from the seal-to-shaft interface per the teachings of U.S. Pat. No. 4,610,319. Slight axial shaft motions occur in many types of rotating machinery due to component flexibility and various internal clearances. The sharp corner 16, which is commonly known as the exclusion side or exclusion edge, excludes contaminants by performing a shaft scraping function during such axial shaft motions. Thus, as relative axial movement occurs between the shaft and seal, accumulated contaminants are scraped from the sealing surface of the shaft so that the dynamic sealing interface remains free of contaminants. This exclusionary action is described in detail in U.S. Pat. No. 4,610,319.

The illustration of FIGS. 2 and 2A illustrates the customary type of general purpose Kalsi Seals rotary shaft seal that positions and configures the exclusionary edge 16 and the environmental end 9 of the seal 5 in such a manner that they are largely supported by the gland wall 20 in a manner that resists distortion and extrusion of seal material in those instances when the seal is subjected to the hydrostatic force resulting from the lubricant pressure acting over the area between the static sealing interface and the dynamic sealing interface. Such force occurs when the lubricant pressure is higher than the environment pressure. FIGS. 1, 2 and 2A show the seal being forced against the gland wall 20 by hydrostatic force resulting from the lubricant pressure acting over the area between the static sealing interface and the dynamic sealing interface.

The projection 21 of the static sealing lip is typically less than or equal to one-half of the nominal radial compression so that most or all of the seal surface from circular corner 23 to circular corner 24 is brought into close proximity or direct contact with the mating counter-surface 11 of the seating groove when the seal is compressed. The close proximity and/or contact between the seal and the seat groove in the general vicinity of circular corner 23 provides stability against clockwise twisting of the seal within the gland, with the clockwise direction being visualized with respect to FIG. 2. This seal stabilization feature is important in implementations where a hydrostatic and/or mechanical force is applied to the environmental end 9 of the seal, such as during transient pressure fluctuations or when the dynamic sealing interface exclusionary edge 16 is required to actively scrape contaminants off of an axially moving shaft. The projection 22 of the dynamic sealing lip 12 is substantially greater than one-half of the nominal radial compression of the seal so that the seal surface at the radially inner circular corner 25 is not brought into contact with the relatively rotating counter-surface 14, and so that the angulated, axially varying hydrodynamic inlet geometry 15 is not overly flattened against the relatively rotating counter-surface so that the intended hydrodynamic wedging of lubricant into the dynamic sealing interface is not impeded by any undesirable gross distortion of the hydrodynamic geometry.

The static sealing lip 10 has generally the same cross-sectional geometry as the average cross-sectional configuration of the dynamic sealing lip 12 except that it is shorter; therefore when the seal is compressed, the interfacial contact force profiles and deformation of the two lips are very similar in both magnitude and location, and as a result, there is no gross tendency for the seal to twist within the gland. This means that the abrupt sharp edge 16 remains compressed firmly against the shaft, and can perform its intended scraping and exclusionary function so that contaminants from the environment do not enter the dynamic sealing interface.

DESCRIPTION OF THE PROBLEM

Referring again to FIG. 2, the installed axial length 26 of the seal can vary considerably due to a number of factors, including tolerances, variations in radial compression, and differential thermal expansion, as will be described in detail immediately here-after.

Firstly, the manufacturing tolerance on the length of the seal contributes directly to variations in the installed axial length 26 of the seal.

Secondly, radial compression of the seal causes a corresponding volume of material to be displaced axially, resulting in a length increase to the seal. The manufacturing tolerance of the housing groove diameter, of the shaft sealing diameter, and of the seal radial cross-section all cause variations in radial compression of the seal. Lateral offset of the shaft with respect to the housing due to bearing clearance and elastic shaft deflection also causes variations in radial compression of the seal. Such unavoidable variations in radial compression contribute significantly to variations in the installed axial length 26 of the seal. Thirdly, the coefficient of thermal expansion of the elastomeric sealing element is usually about 10 times greater than that of the housing and shaft, which are usually made from metal. The seal is often used in an elevated temperature environment, and also generates its own heat due to lubricant shear and asperity contact in the dynamic sealing interface. The seal experiences volumetric thermal expansion (which is about triple the linear coefficient of thermal expansion), but is confined radially and circumferentially, so most of the thermal expansion is relieved axially, which contributes significantly to variations in the installed axial length 26 of the seal.

All of the above mentioned factors can make the installed width of the seal difficult to predict accurately, and in fact even makes the width vary from one circumferential location to another. The gland length 27 is therefore designed to accommodate the worst case installed seal length so that the gland cannot become overfilled, which could cause dramatically increased interfacial contact pressure, which could in turn damage the dynamic sealing lip due to impairment of the hydrodynamic film, and due to the resulting wear and increased local temperature. Under all operating conditions there is by design sufficient axial clearance 28 between the seal and the gland so as to avoid overfilling of the gland.

In the uncompressed state of the seal 5, the outer diameter of the static sealing lip 10 is a larger diameter than the mating counter-surface 11 of the installation groove so that radial compression occurs at the time of assembly as intended. The diametric difference between the static lip 10 of the seal and the mating counter-surface 11 of the groove also causes the seal to undergo circumferential compression at the time of installation, as well as the intended radial compression. This circumferential compression causes troublesome secondary effects, as will be described in detail here-after.

If the seal were unrestrained by the gland, the volumetric thermal expansion of the seal at service temperatures would cause the circumference of the seal to grow considerably. For example, with the elastomer HSN which has a coefficient of linear thermal expansion of 0.000093 inches per inch per degree f, the unrestrained circumference would grow by about 2.15% with a temperature increase of 230° f. When the seal is constrained by the gland, as it is in actual service, the circumferential thermal expansion has the effect of placing the seal under additional circumferential compression.

Since the circumference of the seal is relatively long in comparison to the cross-section of the seal, the load imposed by the installation and thermal expansion imposed circumferential compression can cause the seal to bend or buckle within the clearance 28 between the seal and the gland in a manner similar to the classic textbook example of the bending or buckling of a long, slender structural column under compressive loading.

When the pressure of the lubricant 6 is higher than that of the environment 7, the hydrostatic pressure of the lubricant forces the environmental end 9 of the seal against the gland wall 20 and supports the seal against the above described circumferential compression-induced buckling, and the exclusionary edge 16 is held in the intended non-axially varying position and therefore does not generate a hydrodynamic wedging action with the environment in response to relative rotary motion, and thereby functions as intended to exclude particulate contaminants from the seal-to-shaft interface.

When the pressure of the lubricant 6 is substantially the same as that of the environment 7, little or no hydrostatic pressure is present to support the seal against the above described circumferential compression induced buckling, and buckling will occur if friction between the static sealing lip 10 and the mating counter-surface 11 of the groove is insufficient to prevent said buckling. (The well lubricated interface between the dynamic sealing lip and the shaft counter-surface provides little or no resistance to buckling.)

When buckling occurs, the exclusionary edge 16 assumes an unintended skewed, axially varying position within the gland and therefore can generate an unintended hydrodynamic wedging action with the environment in response to relative rotary motion, which can sweep particulate contaminants into the seal-to-shaft interface and cause abrasive wear of the seal and shaft. Under ideal conditions the hydrodynamic wedging action of the exclusionary edge 16 is still minimal when buckling occurs because of the scraping action provided by the abrupt shape of the exclusionary edge, and because of the corresponding high interfacial contact pressure that occurs between the seal and the shaft at the exclusionary edge which creates conditions which are less than ideal for the generation of a hydrodynamic wedging action. In some cases, however, the compression induced buckling of the seal can also cause the buckled portion of the seal to twist within the gland in a counter-clockwise direction (as visualized with respect to FIG. 2) causing the sharp edge of the seal to be tilted away from the shaft so that the buckled portion of the seal has a gradually converging relationship with the shaft (rather than an abrupt relationship) which, in conjunction with the buckling-induced axial variation, is eminently suitable for the generation of a hydrodynamic wedging action in response to relative rotation of the shaft which can force contaminants into the seal-to-shaft interface and cause rapid abrasive wear of the seal and shaft.

SUMMARY OF THE INVENTION

The present invention is a hydrodynamically lubricated, squeeze packing type rotary shaft seal which overcomes the buckling-induced abrasive wear problem previously enumerated. The hydrodynamic rotary shaft seal of this invention is provided with an axially varying shape on the lubricant side of the dynamic sealing interface for the purpose of hydrodynamic lubrication of the dynamic sealing interface, and has a straight, sharp-cornered non-axially varying exclusionary shape on the environmental side of the dynamic sealing interface for the purpose of excluding contaminants. More specifically, the hydrodynamic seal of this invention is an evolutionary improvement to the commercially available type of hydrodynamic rotary shaft seal which is manufactured and sold by Kalsi Engineering, Inc. of Sugar Land, Tex. under U.S. Pat. No. 4,610,319 and 5,230,520.

The present invention improves the environmental exclusion performance of the aforementioned type of hydrodynamic seal when the seal is used in unpressurized or low pressure lubricant retention applications in abrasive environments. The improvement is accomplished by eliminating the currently experienced and above described compression-induced buckling action and the sometimes-concurrent twisting action which can generate an unintended hydrodynamic wedging action with the environment in response to relative rotary motion and sweep particulate contaminants into the seal-to-shaft interface and cause abrasive wear of the seal and shaft. The improved performance of the exclusionary feature of the seal results in substantially increased sealing life when the seal is used for unpressurized or low pressure lubricant retention applications in abrasive environments. The invention is a hydrodynamically lubricated, squeeze packing type rotary shaft seal which incorporates one or more resilient protuberances that serve as axial compression springs and cooperate with the gland walls to hold the seal straight in its installation groove in unpressurized and low pressure lubricant retention applications, thereby preventing skew-induced wear caused by impingement of abrasive contaminants present in the environment, and which also incorporates one or more integrally molded hydrodynamically lubricated bearings that support the seal against twisting. These features cooperate to prevent the previously described circumferential compression-induced buckling and twisting of the seal that can lead to premature abrasive wear of the seal and shaft.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention may admit to other equally effective embodiments.

IN THE DRAWINGS

Figure 1:
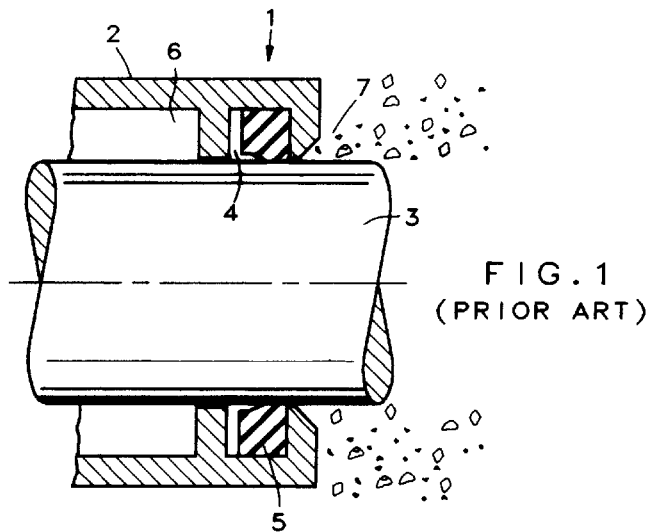

FIG. 1 is a partial cross-sectional illustration of a housing and rotary shaft arrangement incorporating a hydrodynamic seal representative of the prior art.

Figure 2A:
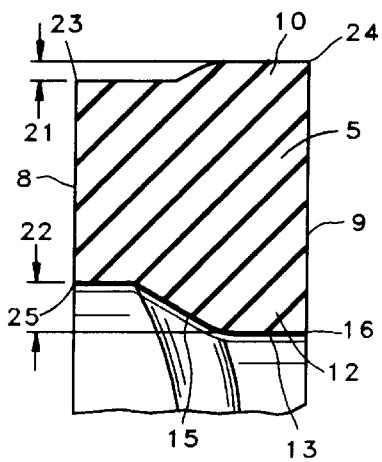
Figure 2:
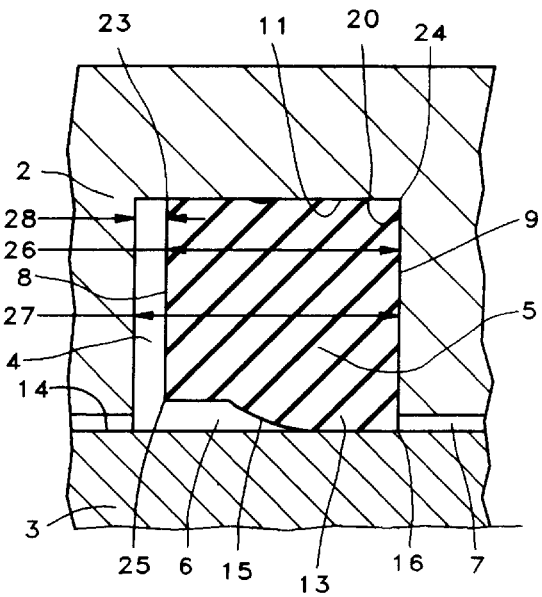

FIGS. 2 and 2A are fragmentary sectional views of a general purpose hydrodynamic seal representing the prior art and shown in FIG. 2 to be located in radially compressed condition within a sealing gland and establishing hydrodynamic sealing engagement with a rotary shaft; the seal being shown in the uncompressed condition thereof in FIG. 2A.

Figure 3:
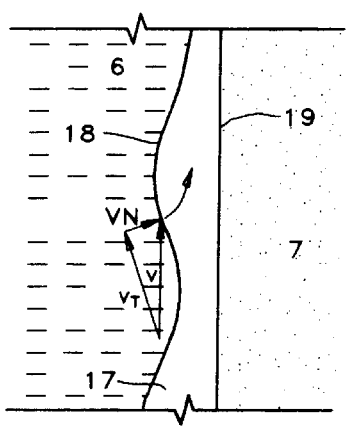

FIG. 3 is a flat development which represents the configuration of the sealing interface of a prior art hydrodynamic seal and which illustrates the theoretical generation of the hydrodynamic wedging or pumping action thereof.

FIGS. 4A, 4B and 4C are fragmentary illustrations of a hydrodynamic rotary shaft seal representing the preferred embodiment of the present invention with the end view 4A and the cross-sectional view FIG. 4B showing the uncompressed condition of the seal, and with the cross-sectional view FIG. 4C illustrating the compressed condition of the seal as installed within a gland and establishing hydrodynamic sealing engagement with a rotary shaft.

FIGS. 5A through 10 are fragmentary sectional views of squeeze packing seals representing various alternate embodiments of the present invention being shown in the uncompressed condition thereof.

DETAILED DESCRIPTION OF PREFERRED EMBODIMENT

Referring now to the drawings, and specifically to FIGS. 4A, 4B and 4C, there are shown two views that represent the uncompressed configuration of the improved hydrodynamic rotary shaft seal representing the preferred embodiment of this invention, and one view that represents the compressed configuration of the squeeze packing type seal of this invention.

FIG. 4A is a fragmentary end view of the lubricant end of the seal in the uncompressed configuration, and FIG. 4B is a fragmentary cross-sectional view of the seal in the uncompressed configuration. FIGS. 4A and 4B are oriented in third angle projection with respect to one another so that they can be interpreted together by the standard conventions of multi and sectional view orthographic drawing projection practiced in the United States and described in ANSI Y14.3-1975, an Industry Standardization Document promulgated by ASME. Section 3-4.2.1 has been interpreted to mean that the circular body of the seal should be cross-hatched in sectional view, while the protuberances (described below) should be drawn in outline form without cross-hatch lines to avoid conveying a false impression of circumferential solidity.

FIG. 4C is a fragmentary view which represents the cross-sectional configuration of the seal of the present invention when located within its seal groove and radially compressed between the rotary shaft and the radially outer wall of the seal groove under conditions where the lubricant and environment pressures are substantially the same. In FIG. 4C there is shown a cross-sectional view of a sealed rotary shaft assembly including a housing 102 from which extends a rotary shaft 103. The housing defines an internal seal installation groove, seat or gland 104 within which is located a ring shaped hydrodynamic rotary shaft sealing element 105 which is constructed in accordance with the principles of the present invention. The sealing element is a resilient, ring shaped squeeze packing that may be composed of any one of a number of suitable materials including elastomeric or rubber-like sealing material and various polymeric sealing materials, or any suitable combination thereof, including a composite construction where one end of the seal is of a different hardness than the other.

The hydrodynamic seal 105 is used as a partition to separate the lubricant 106 contained within the housing 102 from the environment 107, and to prevent intermixing of the lubricant and the contaminant matter present within the environment. The environment usually contains highly abrasive particulate matter within a liquid vehicle. From an overall orientation standpoint, the end of the circular sealing element 105 which is oriented toward the lubricant is surface 108 and the end of the seal which is oriented toward the environment 107 is surface 109, the inner diameter of the seal is represented at 113, and the outer diameter is represented at 114. The compressed configuration of the seal shown in FIG. 4C is representative of its shape when the lubricant 106 and the environment 107 are at substantially the same pressure.

When the seal 105 is installed in the circular seal groove or seat 104, a circular radially protruding static sealing lip 110 is compressed against a counter-surface 111 of the groove per the teachings of U.S. Pat. No. 5,230,520. At the inner periphery of the circular sealing element 105 there is provided an inner circumferential protuberance 112 that defines a dynamic sealing surface 113 that is compressed against a counter-surface 114 of the rotatable shaft 103. The circular seat or seal groove 104 of the housing 102 is sized to hold the resilient circular sealing element 105 in radial compression against the cylindrical sealing surface 114 of the shaft 103, thereby initiating a static seal with the housing and shaft in the same manner as any conventional squeeze packing seal, such as an O-Ring. When shaft rotation is not present, a liquid tight seal is maintained at the static sealing interface between the static sealing lip 110 and the mating peripheral counter-surface 111 of the seat, and between the dynamic sealing lip 112 and the counter-surface 114 of the shaft 103.

When shaft rotation takes place, the hydrodynamic seal remains stationary with respect to the housing, and maintains a static sealing interface with said housing, while the seal-to-shaft interface becomes a dynamic sealing interface. The inner peripheral surface of the hydrodynamic seal inner lip 112 incorporates a special patented geometry that promotes long seal life by hydrodynamically lubricating the dynamic seal-to-shaft interfacial zone, and by excluding environmental contaminates from the seal to shaft interface; this special geometry consists of a wavy, axially varying edge 115 on the lubricant side of the lip and a straight, sharp edge 116 on the environmental side of the lip per the teachings of U.S. Pat. No. 4,610,319. FIGS. 4B and 4C are taken at a circumferential location which represents the average interfacial contact width of the dynamic sealing interface, which corresponds to the mid-point in the wave height of the geometry described in U.S. Pat. No. 4,610,319 which generates the lubricant wedging action.

As relative rotation of the shaft takes place, the wavy, axially varying edge 115 on the lubricant side of the lip, which has a gradually converging relationship with the shaft in the axial and circumferential directions, generates a hydrodynamic wedging action that introduces a lubricant film between the seal inner surface 113 and the counter-surface 114 of the shaft per the previously described teachings of U.S. Pat. No. 4,610,319. This lubricant film physically separates the seal and the shaft, and thereby prevents the typical dry rubbing type wear associated with conventional non-hydrodynamic squeeze packing type seals, and thereby prolongs seal and mating shaft surface life and makes higher service pressures practical. The geometry of the hydrodynamic inlet geometry can take any one of many suitable forms that result in a gradually converging, axially varying shape at the lubricant side of the dynamic sealing lip without departing from the spirit or scope of the present invention.

The sharp circular corner 116 of the environmental side of the seal is not axially varying, and does not generate a hydrodynamic wedging action with the environment in response to relative rotary motion, and thereby functions to exclude particulate contaminants from the seal-to-shaft interface per the previously described teachings of U.S. Pat. No. 4,610,319. Slight axial shaft motions occur in many types of rotating machinery due to component flexibility and various internal clearances. The sharp corner 116, which is commonly known as the exclusion side or exclusion edge, excludes contaminants by performing a shaft scraping function during such axial shaft motions. Thus, as relative axial movement occurs between the shaft and seal, accumulated contaminants are scraped from the sealing surface of the shaft so that the dynamic sealing interface remains free of contaminants. This exclusionary action is described in detail in U.S. Pat. No. 4,610,319.

The projection 121 of the static sealing lip is usually less the than or equal to one-half of the nominal radial compression of the seal per the teachings of U.S. Pat. No. 5,230,520 so that most or all of the seal surface from circular corner 123 to circular corner 124 is brought into direct contact or close proximity with the mating counter-surface 111 of the seating groove when the seal is compressed. The close proximity and/or contact between the seal and the seat groove in the general vicinity of circular corner 123 provides stability against clockwise twisting of the seal within the gland, with the clockwise direction being visualized with respect to FIG. 4C. This seal stabilization feature is important in implementations where a hydrostatic and/or mechanical force is applied to the environmental end 109 of the seal, such as during transient pressure fluctuations or when the dynamic sealing interface exclusionary edge 116 is required to actively scrape contaminants off of an axially moving shaft. The projection 122 of the dynamic sealing lip 112 is substantially greater than one-half of the nominal radial compression of the seal per the teachings of U.S. Pat. No. 5,230,520 so that the angulated, axially varying hydrodynamic inlet geometry 115 is not overly flattened against the relatively rotating counter-surface so that the intended hydrodynamic wedging of lubricant into the dynamic sealing interface is not impeded by any undesirable gross distortion of the hydrodynamic geometry. The radially inward projection of lip 112 is shown by dimension 122.

Except for being shorter, the static sealing lip 110 has generally the same cross-sectional geometry as the average cross-sectional configuration of the dynamic sealing lip 112 per the teachings of U.S. Pat. No. 5,230,520; therefore when the seal is compressed, the interfacial contact force profiles and deformation of the two lips are very similar in both magnitude and location and as a result, there is no gross tendency for the seal to twist within the gland due to gross non-symmetric compression.

The principle geometric feature of the present invention is the presence of a plurality of resilient protuberances 200 that serve as compression springs in the axial direction and serve as radial bearings in the radial direction. The protuberances project axially from the circular body of the seal by the axial projection dimension 201 and project radially inward from the circular body of the seal by the radial projection dimension 203.

The magnitude of the radially inward projection 202 of the resilient protuberances 200 is approximately equal to the radially inward projection 122 of the dynamic lip 112 less the nominal compression of lip 112, so that when the seal is compressed within its gland, the radially inward projection is in nominal contact with the relatively rotating counter-surface 114 of the shaft 103 at radial bearing surface 204. Depending on tolerances and lateral offset between the shaft and housing, the positional relationship between the radial bearing surface 204 and the shaft surface 114 may range from slight clearance to slight radial compression. The nominal contact between the radial bearing surface 204 and the shaft provides stability against counter-clockwise twisting of the seal within the gland, with the counter-clockwise direction being visualized with respect to FIG. 4C, so that the abrupt circular exclusionary corner 116 remains in firm contact with the shaft so that it can perform its intended exclusionary function. The radial bearing surface 204 employs a geometry which provides a gently converging relationship with the shaft in the circumferential direction, as illustrated by the radius 203 depicted in the end view of FIG. 4A The gently converging relationship between the radial bearing surface 204 and the counter-surface 114 of the shaft serves to hydrodynamically wedge a lubricant film into the contact zone between the projection and the shaft in response to relative shaft rotation. This lubricant film physically separates the radial bearing surface 204 and the shaft, and thereby prevents the unlubricated friction-induced heat and torque that would be associated with dry rubbing type wear. The size, shape, and hydrodynamic inlet geometry of the radial bearing can take any one of many suitable forms that result in a gradually converging relationship with the shaft without departing from the spirit or scope of the present invention.

When the circular sealing element 105 is located within its seal groove and radially compressed between the rotary shaft and the radially outer wall of the seal groove, the radial compression of the seal causes the compressed material to be displaced axially, resulting in a length increase to the seal in the axial direction.

The coefficient of thermal expansion of the resilient sealing element is usually about 10 times greater than that of the housing and shaft, which are usually made from metal. The seal is often used in an elevated temperature environment, and also generates its own heat due to lubricant shear and asperity contact in the dynamic sealing interface. The seal experiences volumetric thermal expansion (which is about triple the linear coefficient of thermal expansion), but is confined radially and circumferentially, so most of the thermal expansion is relieved axially, resulting in a length increase to the seal in the axial direction.

The room temperature uncompressed overall length 205 of the seal and the overall length 206 of the gland are sized so that the installed, in-service length increase of the seal causes the resilient protuberances 200 to experience axial compression against the lubricant side gland wall 207 and causes the environmental end 109 of the seal to react against the environment side gland wall 120. Since the resilient protuberances 200 are of much lighter construction than the circular body of the seal, most of the above mentioned axial compression of the seal is absorbed by deflection of the resilient protuberances 200. The force resulting from axial compression of the resilient protuberances 200 forces the environmental end 109 of the seal into firm contact with the environmental gland wall 120 and supports the seal against (the previously described) circumferential compression induced buckling that could otherwise occur, and the abrupt exclusionary corner 116 is therefore held in the intended non-axially varying position and therefore can not generate a hydrodynamic wedging action with the environment in response to relative rotary motion, and thereby functions as intended to exclude particulate contaminants from the seal-to-shaft interface.

As mentioned previously, the seal shown in FIG. 4C is illustrated as it would be oriented when the pressure of the lubricant 106 and environment 107 are substantially the same, and the seal is being forced against the environmental gland wall by the axial compression of the resilient protuberances 200. Since the environment end 109 of the seal has the same shape as the environmental gland wall 120, and since the extrusion gap 208 between the housing and shaft is small, the seal as shown in FIGS. 4A, 4B and 4C is also well suited for service conditions where the lubricant pressure 106 is significantly greater than that of the environment, because the seal is well supported against the differential pressure by the gland wall, and the general shape of the seal is therefore not distorted by the differential pressure acting over it.

Although the dynamic sealing lip and the static sealing lip are shown in FIGS. 4A, 4B and 4C to be positioned at the extreme environmental end of the seal for favorable support should the seal be employed in high differential pressure lubricant retention service, such lip placement is not mandatory for low pressure differential service provided that the lips are positioned in an opposed manner so that radial compression of the seal under low pressure conditions does not induce twisting of the seal within its gland.

Spacing 205 is provided between the resilient protuberances 200 to serve several critical functions. The spacing 205 provides room for thermal expansion of the resilient protuberances 200, and provides room for material displaced circumferentially by axial compression of the resilient protuberances 200. If Spacing 205 were not provided, the seal could overfill the gland, which would dramatically increase interfacial contact pressures, which would have a significant negative effect on seal performance. The spacing 205 between the resilient protuberances 200 also provides lubricant communication to the hydrodynamic inlet geometry 115 of the dynamic sealing lip 112. The spacing 205 between the resilient protuberances 200 is close enough so that the seal spans between the supporting protuberances do not deflect excessively when the seal is exposed to conditions where the pressure of the environment 107 is up to approximately 150 psi higher than the pressure of the lubricant 106; such excess deflection would cause axial variation in the position of corner 116 that could generate a hydrodynamic wedging action with the environment in response to relative rotary motion of the shaft. (150 psi is believed to be the upper bound of reverse pressure seen by a rotary seal that is mounted in a sliding piston to serve as a partioning device between the lubricant and the environment in a drilling motor sealed bearing assembly.)

This invention has application where rotary shafts are sealed with respect to a housing with either the housing or the shaft being the rotary member. The projecting dynamic and static sealing lips can be on the inside and outside of the seal cross-sectional shape when the seal is compressed in the radial direction, with the dynamic lip being located on either the inner or the outer periphery. Alternately, the projecting dynamic and static sealing lips can be on opposite ends of the seal cross-sectional shape when the seal is compressed in an axial direction against relatively rotating planar countersurfaces.

DESCRIPTION OF ALTERNATIVE EMBODIMENTS

Figure 5A:
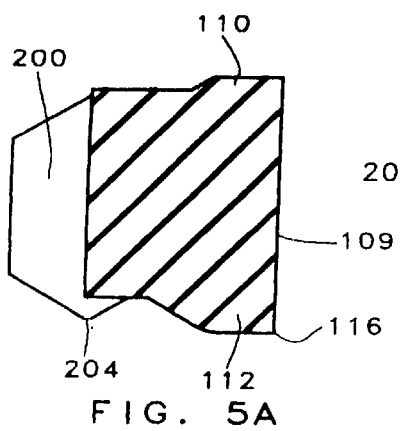
Figure 5B:
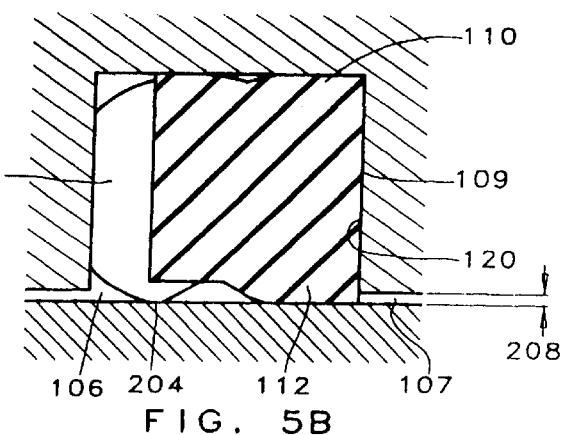
Figure 6:
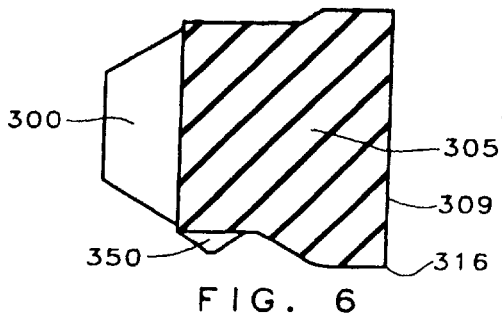

FIG. 6 illustrates an alternate embodiment of the invention in the uncompressed configuration wherein a hydrodynamic seal 305 is shown that is substantially identical to the embodiment shown in FIG. 4A, 4B and 4C except that the dual functions of the resilient protuberances 200 shown in FIG. 4A, 4B and 4C are instead performed independently by the separate resilient protuberances 300 and 350 of FIG. 5. A plurality of resilient protuberances 300 serve as compression springs in the axial direction to hold the abrupt circular corner 316 the intended non-axially varying position, and a plurality of resilient protuberances 350 serve as radial bearings in the radial direction to provide stability against counter-clockwise twisting of the seal within the gland, with the counter-clockwise direction being visualized with respect to FIG. 5.

Figure 7:
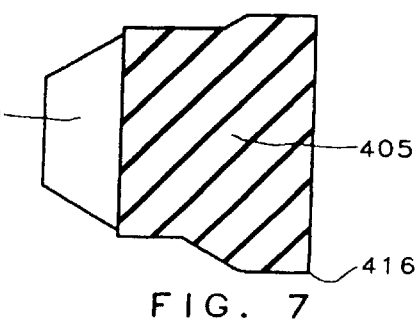

FIG. 7 illustrates an alternate embodiment of the invention in the uncompressed configuration wherein a hydrodynamic seal 405 is shown that is very similar to the embodiment shown in FIG. 4A, 4B and 4C except that the resilient protuberances 400 only have one function; to serve as compression springs in the axial direction to hold the abrupt circular corner 416 in the intended non-axially varying position. The radial bearing function disclosed in FIGS. 4A, 4B, and 4C is not incorporated. The resilient protuberances 400 could be on the lubricant side, as shown, or on the environmental side, or in opposing positions on both the lubricant and the environmental sides, and still fulfill the function of holding the abrupt circular corner 416 in the intended non-axially varying position via axial compressive force.

Figure 8:
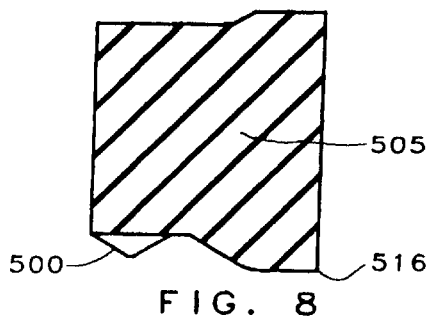

FIG. 8 illustrates an alternate embodiment of the invention in the uncompressed configuration wherein a hydrodynamic seal 505 is shown that is very similar to the embodiment shown in FIGS. 4A, 4B and 4C except that the resilient protuberances 500 only have one function; to serve as radial bearings in the radial direction to provide stability against counter-clockwise twisting of the seal within the gland so that the exclusionary edge does not become tilted in service, with the counter-clockwise direction being visualized with respect to FIG. 7. The axial spring function disclosed in FIGS. 4A, 4B, and 4C is not incorporated.

Figure 9:
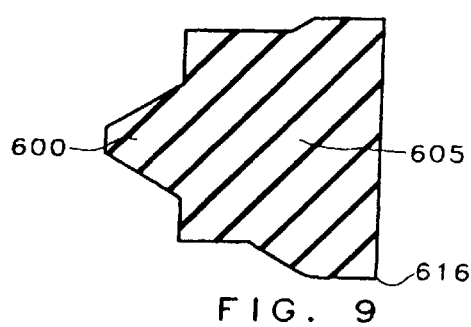

FIG. 9 illustrates an alternate embodiment of the invention in the uncompressed configuration wherein a hydrodynamic seal 605 having a circular static sealing lip 610 and a circular dynamic sealing lip 612 is shown incorporate a single circular resilient protuberance 600 that serves as a compression spring in the axial direction to hold the seal 605 is supported engagement with the gland wall and thus support the abrupt circular corner 616 of the dynamic sealing lip 112 in the intended non-axially varying position. Space is provided on the ID and OD of circular resilient protuberance 600 for thermal expansion of circular resilient protuberance 600 and for material displaced by compression of circular resilient protuberance 600.

Figure 10:
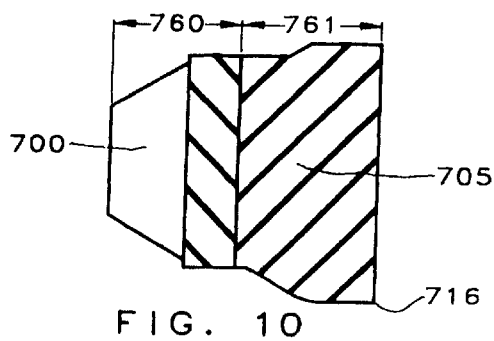

FIG. 10 illustrates an alternate embodiment of the invention in the uncompressed configuration wherein a hydrodynamic seal 705 is shown that is identical in external geometry to the embodiment shown in FIG. 7; the resilient protuberances 700 only have one function; to serve as compression springs in the axial direction to hold the abrupt circular corner 716 in the intended non-axially varying position. The radial bearing function disclosed in FIGS. 4A, 4B, and 4C is not incorporated. The difference between this embodiment and that of FIG. 7 is that this embodiment is a composite of two different resilient materials, rather than being made entirely from one material. The resilient material composing length 761 is a relatively hard material, which provides the required abrasion resistance for the rotary service. The resilient material composing length 760 is a relatively soft material that provides a lower axial spring force compared to a seal made entirely out of the harder material.

As will be readily apparent to those skilled in the art, the present invention may be produced in other specific forms without departing from its spirit or essential characteristics. The present embodiments are therefore to be considered as illustrative and not restrictive.

What is claimed is:

1. A compression-type skew and twist resistant rotary seal adapted to be received within a circular seal groove defined by first and second spaced seal groove walls and a peripheral seal groove wall and adapted for sealing with the peripheral seal groove wall and for establishing a sealing interface with a relatively rotatable surface being in opposed spaced relation with the peripheral seal groove wall and for defining a partition between a lubricant and an environment, said skew and twist resistant rotary seal, comprising:

(a) a solid circular seal body composed of resilient material and adapted to be received within the circular seal groove and defining first and second opposed ends, said circular seal body having less length than the spacing of the first and second spaced seal groove walls, said solid circular seal body adapted for compression between the peripheral seal groove wall and the relatively rotatable surface;

(b) at least one circular dynamic sealing projection extending from said circular seal body for compressed sealing engagement with the relatively rotatable surface and for compressing said circular seal body, and having a wavy hydrodynamic inlet geometry providing for hydrodynamic wedging of a lubricant film between said circular dynamic sealing projection and the relatively rotatable surface responsive to rotation of the relatively rotatable surface;

(c) at least one circular static sealing projection extending from said circular seal body and being located in opposed relation with said circular dynamic sealing projection for compressed static sealing engagement with the peripheral seal groove wall and for compressing said circular seal body;

(d) said circular dynamic sealing projection having a sharp edged circular exclusionary geometry being defined by one end of said circular dynamic sealing projection and adapted to be exposed to the environment for excluding environment intrusion at the sealing interface of said skew and twist resistant rotary seal and the relatively rotatable surface;

(e) at least one resilient spring projection being integral with said circular seal body and projecting from said first end and adapted for spring force transmitting compressed engagement with the first seal groove wall to maintain said first end of said circular seal body in spaced relation with the first seal groove wall to define a seal expansion space between said first end and the first seal groove wall and adapted for urging said second end of said circular seal body into forcible skew and twist resisting engagement with the second seal groove wall to resist skewing and twisting of said rotary seal within the circular seal groove and to prevent development of hydrodynamic wedging action with the environment.

2. The skew and twist resistant rotary seal of claim 1, wherein: said resilient spring projection being of less cross-sectional dimension than said circular seal body and being adapted for non-sealing compression against a first seal groove wall.

3. The skew and twist resistant rotary seal of claim 1, wherein said circular static sealing projection extending from said circular seal body less than the extension of said circular dynamic sealing projection from said circular seal body.

4. The skew and twist resistant rotary seal of claim 1, wherein: said circular static sealing projection and said circular dynamic sealing projection each being located at one axial extremity of said circular seal body.

5. A skew and twist resistant rotary seal assembly, comprising:

(a) a housing having a relatively rotatable surface therein and having a circular seal groove therein defined by first and second spaced axially opposed seal groove walls and a peripheral seal groove wall oriented in opposed relation to said relatively rotatable surface, said housing defining an internal lubricant chamber having lubricant therein to which said relatively rotatable surface is exposed and said housing adapted to be located within an environment having contaminants therein;

(b) a compression type rotary seal having a solid circular ring-like body forming a complete and continuous circle composed of resilient sealing material being received within said seal groove and having compressed sealing engagement with said peripheral seal groove wall of said housing and with said relatively rotatable surface and defining first and second opposed axial ends and, said circular ring-like body being of less axial width than the spacing of said first and second spaced axially opposed seal groove walls and establishing a sealing interface with said relatively rotatable surface and defining a partition between said lubricant and the environment, said solid circular ring-like body adapted for compression between said peripheral seal groove wall and said relatively rotatable surface;

(c) at least one circular dynamic sealing projection being integral with and extending radially from said circular ring-like body and having compressed sealing engagement with said relatively rotatable surface and compressing said circular ring-like body; and (d) at least one resilient spring projection being integral with and extending axially from said first axial end of said circular ring-like body and being in force transmitting axially compressed engagement with said first seal groove wall and maintaining said first axial end of said circular ring-like body in axially spaced non-sealed relation with said first seal groove wall and maintaining said second axial end of said circular ring-like body being in skew and twist resisting supported engagement with said second seal groove wall to resist skewing and twisting of said rotary seal within said seal groove for preventing development of hydrodynamic wedging action with the environment.

6. A skew and twist resistant rotary seal assembly, comprising:

(a) a housing having a relatively rotatable surface therein and having a circular seal groove therein defined by first and second spaced axially opposed seal groove walls and a peripheral seal groove wall, said housing defining an internal lubricant chamber having lubricant therein to which said relatively rotatable surface is exposed and said housing adapted to be located within an environment having contaminants therein;

(b) a rotary seal having a circular ring-like body of resilient sealing material being received within said seal groove of said housing and defining first and second axial ends, said circular ring-like body being of less axial width than the spacing of said axially opposed seal groove walls, said rotary seal establishing a sealing partition between said lubricant chamber and said environment, and having said first axial end thereof exposed to said lubricant;

(c) a circular sealing lip being integral with said circular body of resilient sealing material and projecting radially therefrom and defining a peripheral sealing surface having sealing engagement with said relatively rotatable surface;

(d) an angulated axially varying hydrodynamic inlet geometry being defined by one axial end of said circular sealing lip and being exposed to said lubricant chamber and providing for hydrodynamic wedging of a lubricant film between said peripheral sealing surface and said relatively rotatable surface responsive to rotation of said relatively rotatable surface;

(e) a sharp edged circular exclusionary geometry being defined by the other axial end of said circular sealing lip and adapted to be exposed to said environment for excluding environment intrusion at the interface of said peripheral sealing surface and said relatively rotatable surface; and (f) at least one resilient spring projection extending axially from said first axial end of said circular ring-like body of resilient sealing material and being in force transmitting engagement with said first seal groove wall and maintaining said second axial end of said circular ring-like body of resilient sealing material in supported skew resisting engagement with said second seal groove wall to resist skewing of said rotary seal within said seal groove.

7. The skew and twist resistant rotary seal assembly of claim 6, wherein:

said at least one resilient spring projection being of annular configuration and defining an annular seal groove wall contact surface.

* * * * *